(12) United States Patent
Chiang

(10) Patent No.: US 9,190,843 B2
(45) Date of Patent: Nov. 17, 2015

(54) POWER STRIP

(75) Inventor: Chih-Shang Chiang, Keelung (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 707 days.

(21) Appl. No.: 13/531,476

(22) Filed: Jun. 22, 2012

(65) Prior Publication Data

US 2013/0270909 A1  Oct. 17, 2013

(30) Foreign Application Priority Data

Apr. 13, 2012  (TW) .............................. 101113342 A

(51) Int. Cl.
*H02J 3/02* (2006.01)
*H02J 3/14* (2006.01)
*H02J 13/00* (2006.01)
*H02J 7/00* (2006.01)

(52) U.S. Cl.
CPC ................ *H02J 3/14* (2013.01); *H02J 13/0006* (2013.01); *H02J 2003/143* (2013.01); *H02J 2007/0062* (2013.01); *Y02B 70/3225* (2013.01); *Y02B 70/3266* (2013.01); *Y04S 20/222* (2013.01); *Y04S 20/242* (2013.01); *Y10T 307/469* (2015.04)

(58) Field of Classification Search
CPC ... H02J 3/02; H02J 13/0006; H02J 2003/143; H02J 2007/00623; Y02B 70/3225; Y02B 70/3266; Y04S 20/222; Y04S 20/242
USPC .................... 307/39, 116, 117, 125, 126, 131
See application file for complete search history.

(56) References Cited

U.S. PATENT DOCUMENTS 8,502,414 B2 *  8/2013  Lee et al. .................... 307/31

FOREIGN PATENT DOCUMENTS

| CN | 2534717 Y | 2/2003 |
|---|---|---|
| CN | 101521343 A | 9/2009 |
| CN | 101582550 A | 11/2009 |
| CN | 101925236 A | 12/2010 |
| CN | 101997427 A | 3/2011 |
| CN | 102354870 | 2/2012 |
| TW | M324332 | 12/2007 |
| TW | 200926535 | 6/2009 |

* cited by examiner

*Primary Examiner* — Hal Kaplan
(74) *Attorney, Agent, or Firm* — Li & Cai Intellectual Property (USA) Office

(57) ABSTRACT

The present invention discloses a power strip including a plurality of power sockets and at least one USB port. The power strip includes a high-voltage side circuit and a low-voltage side circuit. The high-voltage side circuit includes a power input terminal, a plurality of AC output terminals, and a first power circuit. The low-voltage side circuit includes a DC output terminal, a second power circuit, and a control unit. Each AC output terminal is coupled with the power input terminal and one of the power sockets and at least one AC output terminal powers the corresponding power socket according to a control signal. The second power circuit senses the first DC power before generating and transmitting a corresponding second DC power to the USB port through the DC output terminal. The control unit powered by the second DC power is configured to generate the control signal.

9 Claims, 4 Drawing Sheets

POWER STRIP

BACKGROUND

1. Technical Field

The present invention relates to a power strip, and in particular, to a power strip which can provide both AC and DC outputs.

2. Description of Related Art

With the advancement of the technology, various kinds of electrical devices weed out the old and bring forth the new constantly, providing a much more convenient and comfortable life to people. However, as the result of the increasing variety of the electronic devices, the number of the original wall plug is no longer sufficient. It's necessary to couple the power strip with the city power, so as to power the increasing number of the electronic devices. Conventionally, the power strip is able to provide not only the AC power sockets for powering the electronic devices, but the DC Universal Serial Bus (hereinafter referred to as USB) port for the electronic devices.

On the other hand, the power strip nowadays can act as the medium to transfer the power, and furthermore, it can be having other multiple functions incorporated. For example, in a master-slave power strip, which is capable of causing different sets of power sockets of that particular power strip to be powered, a control chip is usually incorporated into the power strip. And in order for the control chip to properly operate an extra AC/DC converter is required.

The design and the incorporation of the above-mentioned AC/DC converter might increase additional manufacturing costs.

SUMMARY

An embodiment of the present invention provides a power strip which can supply the DC power not only to the USB port but to the control chip/unit inside the power strip without adding an extra AC/DC converter for the operation of the control chip/unit.

An embodiment of the present invention provides a power strip including a plurality of power sockets and at least a USB port. The above-mentioned power strip includes a high-voltage side circuit and a low-voltage side circuit. The high-voltage side circuit further includes a power input terminal, a plurality of AC output terminals and a first power circuit, while the low-voltage side circuit further includes a DC output terminal, a second power circuit and a control unit. The power input terminal is coupled with the city power. The AC output terminals are coupled with the power input terminal, and each of the AC output terminals is coupled with a corresponding power socket, and at least one AC output terminal is coupled with a first switching element. The first switching element when in operation causes the corresponding power socket to be powered according to a control signal. The first power circuit is coupled with the power input terminal to rectify the city power, so as to generate a first DC power. The DC output terminal is coupled with the USB port. The second power circuit is coupled with the DC output terminal to sense the first DC power, so as to generate a corresponding second DC power and to transmit the second voltage to the USB port through the DC output terminal. The control unit which is powered via the second DC power is coupled with the second power circuit to generate the control signal.

According to an embodiment of the present invention, the low-voltage side circuit further includes an environmental conditions detecting module to determine environmental conditions within a predetermined detecting range. If the environmental conditions satisfy the predetermined condition, the environmental conditions detecting module may drive the control unit to generate the control signal. And the second DC power is used to power the environmental conditions detecting module. Moreover, the low-voltage side circuit might include the second current detecting element, so as to determine whether the loading current of at least the AC output terminal is larger than a predetermined current or not. If so, the second current detecting element may drive the control unit to generate the control signal instructing at least one AC output terminal to stop relaying the city power to the corresponding power socket. It is worth noting that the second DC power may be used to power the second current detecting element To sum up, an embodiment of the present invention provides the power strip which can rectify the AC power into the corresponding DC power. The above-mentioned DC power can power the USB port along with the control unit in the power strip simultaneously. Thus, the control unit inside the power strip could be powered without the AC/DC converter.

In order to further appreciate the characteristics and technical contents of the present invention, references are hereunder made to the detailed descriptions and appended drawings in connection with the present invention. However, the appended drawings are merely shown for exemplary purpose rather than being used to restrict the scope of the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

Figure 1:
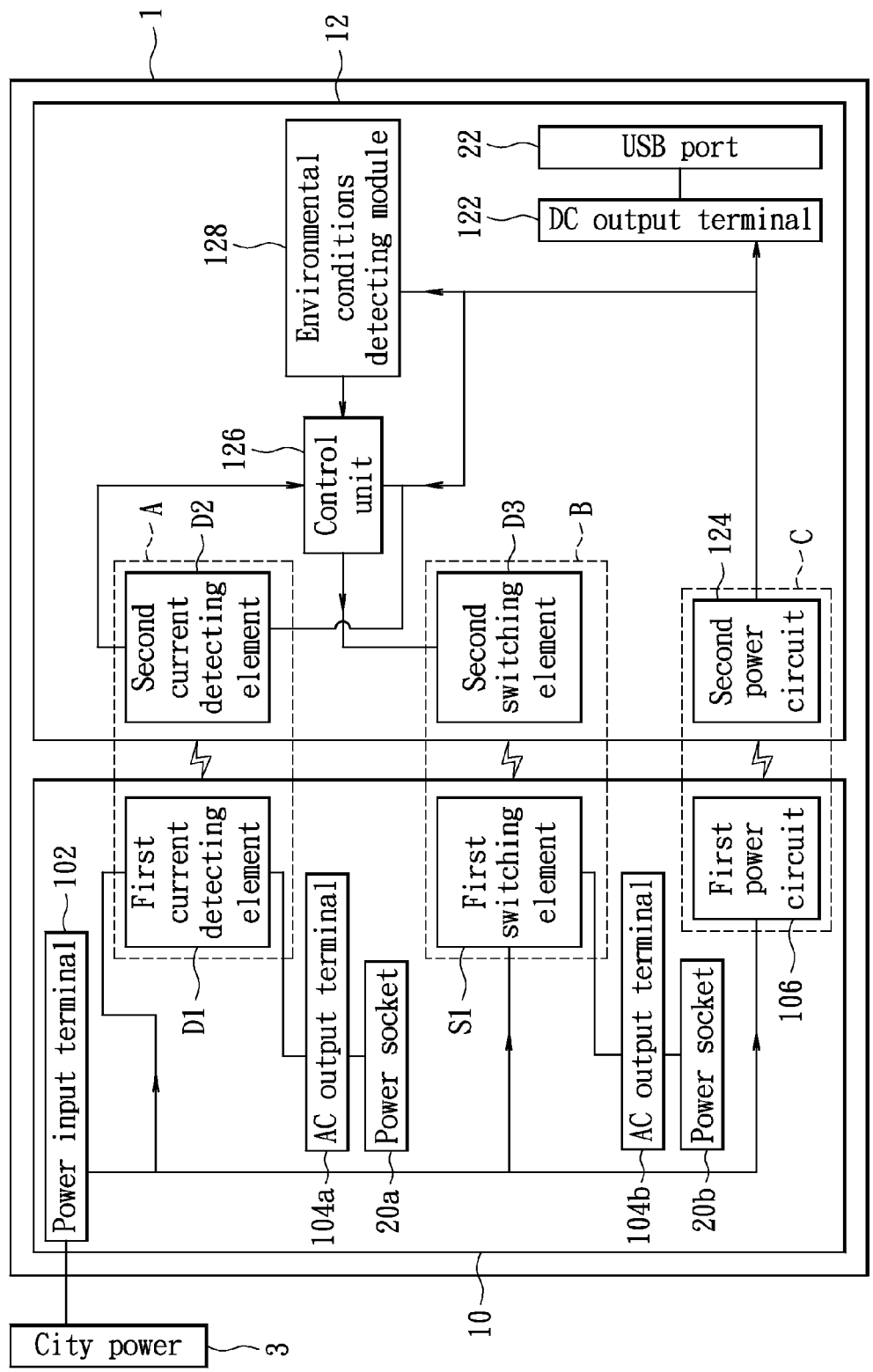
FIG. 1 schematically illustrates a functional block diagram of the power strip according to the embodiment of the present invention.

Referring to FIG. 1, FIG. 1 schematically illustrates a functional block diagram of a power strip according to the embodiment of the present invention. According to FIG. 1, the power strip is used to provide the received alternating current (AC) power of a city power 3 to a plurality of power sockets such as a power socket 20*a* and a power socket 20*b* and to rectify the received AC power of the electrical utility 3 into the corresponding direct current (DC) power for powering an USB port (such as an USB port 22). Accordingly, the power strip 1 is effectively divided into a high-voltage side circuit 10 and a low-voltage side circuit 12, with a set of current detecting circuit A, a set of switching circuit B and a set of power circuit C between the high-voltage side circuit 10 and the low-voltage side circuit 12.

The above-mentioned current detecting circuit A includes a first current detecting element D1 and a second current detecting element D2. In one implementation, the first current detecting element D1 is located within the high-voltage side circuit 10, and the second current detecting element D2 is located within the low-voltage side circuit 12. The above-mentioned switching circuit B includes a first switching element S1 and a second switching element D3, and the first switching element S1 is located within the high-voltage side circuit 10, and the second switching element D3 is located within the low-voltage side circuit 12. The above-mentioned power circuit C meanwhile includes a first power circuit 106 and a second power circuit 124, and the first power circuit 106 is located within the high-voltage side circuit 10, and the second power circuit 124 is located within the low-voltage side circuit 12.

In summary, the elements which are located within the high-voltage side circuit 10 include a power input terminal 102, a AC output terminal 104*a* and 104*b*, the first current detecting element D1, the first switching element S 1, the first power circuit 106, the power socket 20*a* and the power socket 20*b*. And elements which are located within the low-voltage side circuit 12 include a DC output terminal 122, the second current detecting element D2, the second switching element D3, the second power circuit 124, a control unit 126, an environmental condition detecting module 128 and the USB port 22. In one implementation, the high-voltage side circuit 10 and the low-voltage side circuit 12 are seated within the same outer shell of the power strip 1. However, the present invention is not limited thereto. For example, depending on the way of communication between the first current detecting element D1 and the second current detecting element D2 as well as between the first switching element 51 and second switching element D3 and the first power circuit 106 and the second power circuit 124, which may include optical, magnetic, and/or electromagnetic means for facilitating the wireless connection, the high-voltage side circuit_10 and the low-voltage side circuit 12 can also be seated within the different outer shells without affecting the intended function of the power strip 1.

According to this embodiment, the power input terminal 102 of the high-voltage side circuit 10 is connected to the city power 3 directly, so as to take the rating utility AC voltage from the city power 3. In general, the AC voltage of the above-mentioned city power 3 is about 110 or 220V, and the high-voltage side circuit 10 would utilize the city power 3 without any further processing (e.g., conversion). Of course, since the high-voltage side circuit 10 needs to operate with relative higher operating voltages, circuit elements that are more durable under the condition of high voltage are employed in the high-voltage side circuit 10. On the other hand, the low-voltage side circuit 12 would not receive the unprocessed city power. Rather, the low-voltage side circuit is adapted to operate with 5V DC, which comes from the city power 3. For the safety use of the power strip 1, suitable isolation may be in place between the high-voltage side circuit 10 and the low-voltage side circuit 12.

Referring to FIG. 1, in the high-voltage side circuit 10, the power input terminal 102 is coupled to the city power 3 to receive its power. In one implementation, the power input terminal 102 is a power plug which can be plugged into a city power socket. Specifically, the power input terminal 102 may be plugged into a wall power socket. Alternatively, the power input terminal 102 might be electrically connected to the city power 3 via other power strips.

The AC output terminal 104*a* is coupled with the power input terminal 102 via the first current detecting element D1 of the current detecting circuit A, while the AC output terminal 104*b* is coupled with the power input terminal 102 via the first switching element S1 of the switching circuit B indi-vidual. The AC output terminal 104*a* is further coupled with the power socket 20*a*, while the AC output terminal 104*b* is further coupled with the power socket 20*b*. The AC output terminal 104*b* might provide the city power 3 to the power socket 20*b* selectively according to a control signal transmitted from the control unit 126. Since the AC output terminal 104*b* is coupled to the first current detecting element D1, the current fed into the AC output terminal 104*b* from the power input terminal 102 might pass through the first current detecting element D 1. Simultaneously, the second current detecting element D2 which is located in the low-voltage side circuit 12 might sense the current passing the first current detecting element D1, and the sensed current may serve as the basis for the control unit 126 to generate the control signal.

For instance, the control signal might be a current signals transmitted to the second switching element D3. A current signal of the second switching element D3 might be used to control a conducting state (turn on/off) of the first switching element S1. Specifically, the current signal of the second switching element D3 could be adjusted by the control unit 126 for causing the first switching element S1 to be turned on or off. As such, the AC output terminal 104*b* could selectively provide the city power 3 to the power socket 20*b*. In one implementation, the first switching element S1 might be a relay or a power switch.

In practice, if the power strip 1 is implemented in terms of a master-slave power strip, the AC output terminal 104*a* may not be controllable, so that such AC output terminal 104*b* would be providing the city power 3 to the power socket 20*a* when required. On the other hand, the AC output terminal 104*b* may serve as a controllable AC output terminal, which may be controlled according to the control signal to conduct or turn off the transmission path of the current between the city power 3 and the power socket 20*b*. Besides, the power socket 20*a* might be regarded as the master power socket while the power socket 20*b* might be regarded as the slave power socket. It is worth noting that no restriction is intended for the number of the master and slave power sockets.

The first power circuit 106 inside the high-voltage side circuit 10 is coupled with the power input terminal 102 to rectify the city power 3, so as to generate the first DC power. As previously mentioned, the current at the first power circuit 106 may induce the current at the second power circuit 124.

Figure 2A:
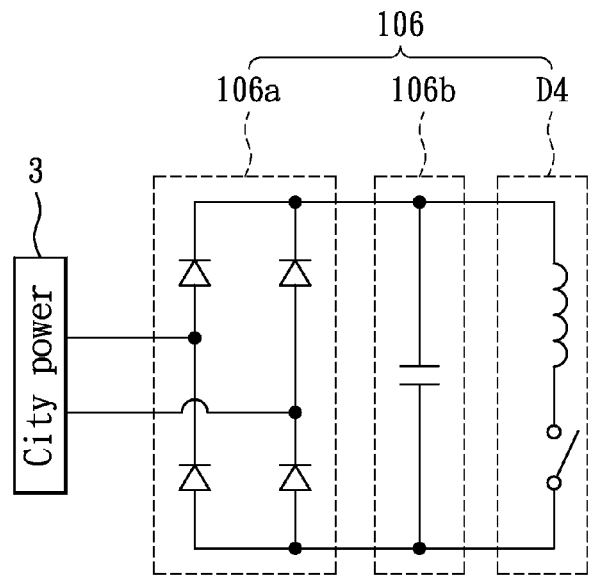
FIG. 2A schematically illustrates a simplified circuit diagram of the first power circuit according to the embodiment of the present invention.
Figure 2B:
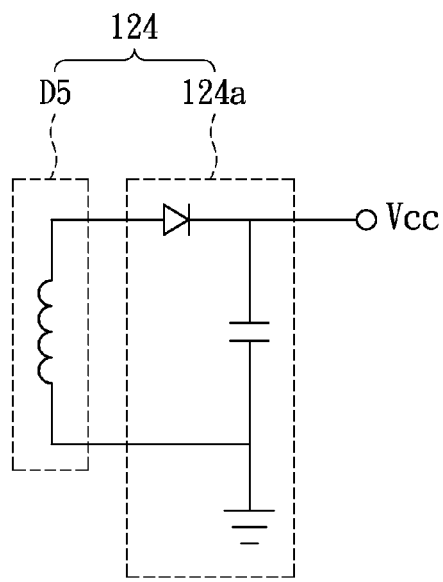
FIG. 2B schematically illustrates a simplified circuit diagram of the second power circuit according to the embodiment of the present invention.

Referring to the FIG. 2A and FIG. 2B, FIG. 2A schematically illustrates a simplified circuit diagram of the first power circuit, while FIG.2B schematically illustrates a simplified circuit diagram of the second power circuit. As shown in the figures, the first power circuit 106 might feed the AC power from the city power 3 into the rectifier 106*a*, so that the AC power from the city power 3 could be rectified into the corresponding DC power with the same polarity. It is worth noting that though a full wave rectifier is employed in FIG. 2A, a half wave rectifier or other suitable circuit might be utilized as well. Nevertheless, the rectified power outputted from the rectifier 106a may not be associated with a constant voltage, in which event a filter capacitor 106b may be required to process the rectified power by reducing ripples on the rectified power. Afterward, the rectified and filtered DC power is coupled with a coil D5 of the second power circuit 124 through a coil D4.

On the other hand, in the low-voltage side circuit 12 the second power circuit 124 not only couples with the DC output terminal 122 but senses the first DC power in the coil D4 of the first power circuit 106, so as to generate the second DC power correspondingly and transmit the second DC power to the USB port 22 through the DC output terminal 122. In practice, despite the coil D5 is not connected to the coil D4 directly, the coil D5 can still sense the current inside the coil D4. With the induced current generated via the coil D5, the second DC power may still be generated, while the ratio relationship between the coil D4 and the coil D5 is equal to the ratio between the first and the second DC power.

In this embodiment, the coil D4 and the coil D5 might be entwined around the same iron core to form a transformer, wherein the turn number of the coil D5 may be less than the turn number of the coil D4, resulting in the second power being the reduced version of the first DC power in the voltage level. Furthermore, since the coil D4 is not in connection with the coil D5 the high-voltage side circuit 10 might be effectively isolated from the low-voltage side circuit 12 to avoid the short circuiting. In addition, the second power circuit 124 might also have a filter 124a, so as to stabilize the second DC power at the output terminal Vcc of the second power circuit 124.

Figure 3A:
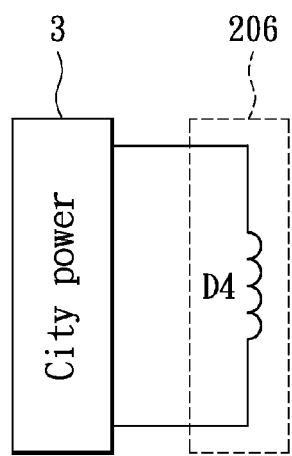
FIG. 3A schematically illustrates another simplified circuit diagram of the first power circuit according to another embodiment of the present invention.
Figure 3B:
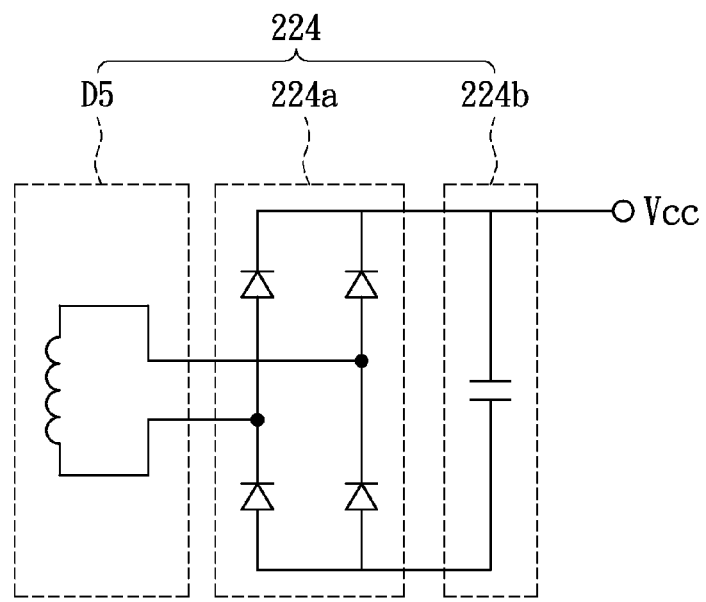
FIG. 3B schematically illustrates another simplified circuit diagram of the second power circuit according to another embodiment of the present invention.

Certainly, the scope of the present invention is not limited to the illustration of FIGS. 2A and 2B. For instance, FIG. 3A also shows another example simplified circuit diagram of the first power circuit while FIG. 3B illustrates another example simplified circuit diagram of the second power circuit. As shown in FIGS. 3A and 3B, a first power circuit 206 might only include the coil D4 without the rectifier and the filter capacitor, while a second power circuit 224 might in addition to the coil D5 include the rectifier 224a and the filter capacitor 224b. Through the circuit structure of FIG. 3A and FIG. 3B differ from the one of FIG. 2A and FIG. 2B, the intended purpose of the different design choices is for ensuring the output terminal Vcc of the second power circuit 224 could be stabilized.

Figure 4A:
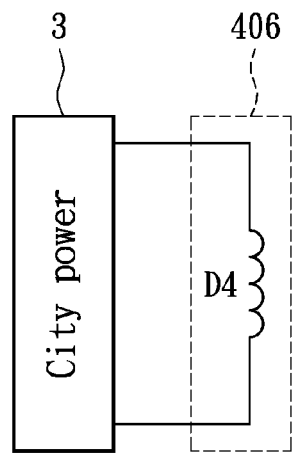
FIG. 4A schematically illustrates another simplified circuit diagram of the first power circuit according to another embodiment of the present invention.
Figure 4B:
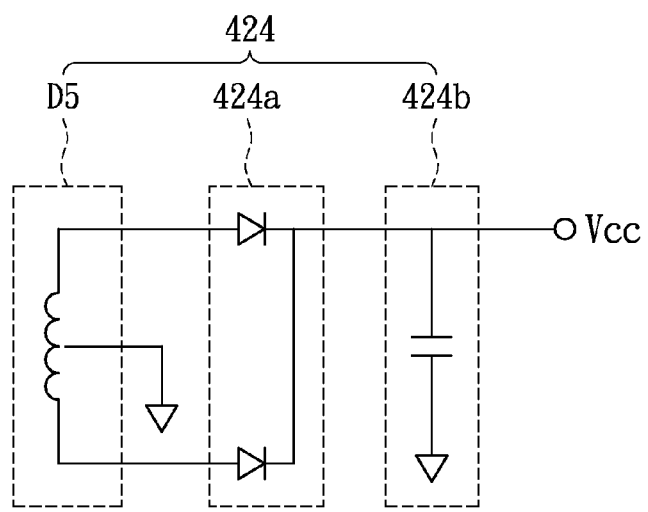
FIG. 4B schematically illustrates another simplified circuit diagram of the second power circuit according to another embodiment of the present invention.

Moreover, FIG. 4A and FIG. 4B show a first power circuit 406 and a second power circuit 424, respectively, according to another embodiment of the present invention in terms of simplified circuit diagrams. The first power circuit 406 might include the coil D4, while the second power circuit 424 includes the coil D5 and the rectifier 424a. Compared to the second power circuit shown in FIG. 3B, the second power circuit 424a, the filter capacitor 424b and the coil D5 in FIG. 4B are different in their circuit design. The coil D5 of the second power circuit 424 is connected to a ground terminal, so that the rectifier 424a can rectify the AC power with only two rectifier diodes. The above-mentioned might be understood via a person skilled in the art, and further descriptions are hereby omitted.

Referring to FIG. 1 again, the output terminal Vcc of the second power circuit 124 is coupled with not only the DC output terminal 122 for powering the USB port 22, but also the control unit 126, the environmental condition detecting module 128 and the second current detecting element D2. As such, the control unit 126, the environmental condition detecting module 128, and the second current detecting element D2 could be powered by being connected to the DC output terminal 122. Please note that the environmental condition detecting module 128 may be optional. In other words, the low-voltage side circuit 12 might include the DC output terminal 122, the second current detecting element D2, the second switching element D3, the second power circuit 124, the control unit 126 and the USB port 22 without the environmental condition detecting module 128.

The control unit 126 is used to generate the control signal so as to instruct the first switching element S1, which is coupled with the controllable AC output terminal 104b, to conduct or cut off the current transmission path between the city power 3 and the power socket 20b. In one implementation, the control unit 126 might be a microprocessor (MCU) or might be composed of the several transistors. Operationally, the control unit 126 might be controlled via users directly. Accordingly, whether the power sockets 20b is powered or not may be based on the operation of the control unit 126, which may be based on a remote controller, network signals. For illustrating the operation of the control unit 126, description regarding the environmental condition detecting module 128 and the second current detecting element D2 adapted to dictate the operation of the control unit 126, which in turn determines whether the power socket 20b is powered, is presented in the following paragraphs.

For instance, the environmental condition detecting module 128 can be used to determine whether the environmental condition within a predetermined detecting range satisfies predetermined conditions. If so, the environmental condition detecting module 128 drives the control unit 126 to generate the control signal. In one implementation, the predetermined condition may be whether there is any movement of an object (human operators included) within the above-mentioned detecting range. Thus, if no movement within the detection range is detected, the environmental condition detecting module 128 drives the control unit 126 to control the AC output terminal 104b to stop powering the power socket 20b with the city power 3. In short, the environmental condition detecting module 128 may serve as a motion sensor that causes the power socket 20b to be powered when there is a movement within the detection range or the absence of the movement lasts no longer than a predetermined period of time. Under this arrangement, the consumption of the city power 3 may be saved.

The environmental condition detecting module 128 can also detecting whether the temperature around the power strip 1 but within the detecting range is under the predetermined temperature or not. When the temperature around the power strip 1 is too high, the environmental condition detecting module_128 drives the control unit 126 to generate the control signal, causing the AC output terminal 104b to stop relaying the city power 3 to the power socket 20b. In other words, the environmental condition detecting module 128 may function as an over-temperature protecting equipment, so as to keep the power strip 1 from overheat.

Moreover, the environmental condition detecting module 128 can further be used to detect whether the illumination around the power strip 1 is under the predetermined value or not. When the illumination around the power strip 1 is bright enough, the environmental condition detecting module 128 drives the control unit 126 to generate the control signal, causing the AC output terminal 104b to stop relaying the city power 3 to the power socket 20b. As such the power socket 20b may be utilized to cause a table lamp, a night lamp or other illumination apparatus not to be powered when the environmental condition is sufficiently bright.

Furthermore, the environmental condition detecting module 128 can also be used to detect whether an operation time has elapsed. If so, the environmental condition detecting module 128 drives the control unit 126 to generate the control signal, causing the AC output terminal 104b to stop relaying the city power 3 to the power socket 20b. Therefore, the environmental condition detecting module 128 can be a timer on basis of which the power could be shut off when the operation time has elapsed (e.g., after people already leave the office).

Besides, the second current detecting element D2 can be used to detect whether the loading current of the AC output terminal 104b is larger than the predetermined value. If so, the second current detecting element D2 drives the control unit 126 to generate the control signal, causing the AC output terminal 104b to stop relaying the city power 3 to the power socket 20b. The second current detecting element D2 therefore could have a control over the power socket 20b according to the power usage thereof. For instance, the second current detecting element D2 can prevent the AC output terminal 104b form outputting too much current to the power socket 20b, or can promptly respond to the condition in which the power socket 20b or the AC output terminal 104b malfunctions.

The power strip disclosed in the present invention is not only capable of rectifying the AC power into the corresponding DC power for powering the USB port but utilizing the same rectified DC power for powering the control unit and other electronic elements. In doing so, the same rectified DC power could be better utilized, and the need of preparing additional DC power for the operation of the control unit, which conventionally requires an AC-DC converter, could be eliminated. Plus, the low-voltage side circuit and the high-voltage side circuit are properly isolated from each other, ensuring the safety of the operation of the power strip.

While the embodiments of the present invention have been set forth for the purpose of disclosure, without any invention to limit the scope of the present disclosure thereto. All changes, alterations, or modifications conveniently considered by those skilled in the art and figures are deemed to be encompassed within the scope of the instant disclosure.

What is claimed is:

1. A power strip having a plurality of power sockets and at least an USB port, the power strip comprising:
    a high-voltage side circuit, comprising:
        a power input terminal, coupled with a city power;
        a plurality of alternating current (AC) output terminals, coupled with the power input terminal, each of the AC output terminals coupled with one of the power sockets, and at least one of the AC output terminals coupled with a first switching element, wherein the first switching element is adapted to selectively provide the city power to the power socket according to a control signal; and
        a first power circuit, coupled with the power input terminal, so as to rectify the city power, to generate a first DC power; and
    a low-voltage side circuit, comprising;
        a DC output terminal, coupled with the USB port;
        a second power circuit, coupled with the DC output terminal, so as to sense the first DC power, in order to generate a second DC power, and to transmit the second DC power to the USB port via the DC output terminal; and
        a control unit, coupled with the second power circuit, so as to generate the control signal, wherein the second DC power is used to power the control unit.

2. The power strip of claim 1, wherein the first power circuit further comprises:
    a rectifier, coupled with the power input terminal, so as to rectify the city power; and
    a filter capacitor, coupled with an output terminal of the rectifier, so as to filter the rectified city power of the rectifier to generate the first DC power.

3. The power strip of claim 1, wherein the low-voltage side circuit further comprises:
    an environmental condition detecting module, coupled with the second power circuit, so as to detect environment conditions within a predetermined detecting range, wherein if at least one of the environment conditions satisfies a predetermined condition, the environmental condition detecting module drives the control unit to generate the control signal;
    wherein the second DC power is used to power the environmental condition detecting module.

4. The power strip of claim 3, wherein the environmental condition detecting module is used to detect a movement of an object within the predetermined detecting range, and when the environmental condition detecting module fails to detect the movement of the object within the detecting range the environmental condition detecting module drives the control unit to generate the control signal, which is used to instruct at least one of the AC output terminals to stop providing the power of the city power to the corresponding power socket.

5. The power strip of claim 3, wherein the environmental condition detecting module is used to detect whether a temperature around the power strip is under a predetermined temperature in the detecting range, and when the environmental condition detecting module determines the temperature around the power strip and within the detecting range is higher than the predetermined temperature the environmental condition detecting module drives the control unit to generate the control signal, which is used to instruct at least one of the AC output terminals to stop providing the city power to the corresponding power socket.

6. The power strip of claim 3, wherein the environmental condition detecting module is used to detect whether an illumination around the power strip is over a predetermined value, and when the environmental condition detecting module determines the illumination around the power strip is over the predetermined value the environmental detecting module drives the control unit to generate the control signal, which is used to instruct at least one of the AC output terminals to stop providing the city power to the corresponding power socket.

7. The power strip of claim 3, wherein the environmental condition detecting module is used to detect whether an operation time has elapsed, and when the operation time has elapsed the environmental condition detecting module drives the control unit to generate the control signal to instruct at least one of the AC output terminals to stop providing the city power to the corresponding power socket.

8. The power strip of claim 1, wherein the low-voltage side circuit further comprises:
    a second current detecting element, coupled with the control unit, for detecting whether a loading current of at least one AC output terminal is larger than a predetermined current value, wherein when the loading current of the AC output terminal is larger than the predetermined current value the second current detecting element drives the control unit to generate the control signal, which is used to instruct the first current detecting element which is series coupled with at least one AC output terminal to be cut off, so as to stop providing the city power to the corresponding power socket of the AC output terminal;

wherein the second DC power is used power the second current detecting element.

9. The power strip of claim 1, wherein the AC output terminals comprise at least one controllable AC output terminal and at least one uncontrollable AC output terminal, and the control signal is used to control the controllable AC output terminal, allowing for the controllable AC output terminal to provide the city power to the corresponding power socket.

\* \* \* \* \*